United States Patent
Dhanabalan et al.

(10) Patent No.: US 9,258,576 B2
(45) Date of Patent: Feb. 9, 2016

(54) MULTIMEDIA PROGRAM INFORMATION

(71) Applicant: Verizon Patent and Licensing Inc., Basking Ridge, NJ (US)

(72) Inventors: Sankar Ram Dhanabalan, Irving, TX (US); Kishore Tallapaneni, Flower Mound, TX (US); Mandar Dhonsale, Frisco, TX (US); Ravikumar Thangavel, Farmers Branch, TX (US); Jaykishan Tiwari, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 57 days.

(21) Appl. No.: 14/230,242

(22) Filed: Mar. 31, 2014

(65) Prior Publication Data

US 2015/0281745 A1 Oct. 1, 2015

(51) Int. Cl.

| | | |
|---|---|---|
| *H04N 21/233* | (2011.01) | |
| *H04N 21/4722* | (2011.01) | |
| *H04N 21/2368* | (2011.01) | |
| *H04N 21/439* | (2011.01) | |
| *H04N 21/81* | (2011.01) | |
| *H04N 21/2385* | (2011.01) | |
| *H04N 21/24* | (2011.01) | |
| *H04N 7/16* | (2011.01) | |
| *H04N 21/258* | (2011.01) | |
| *H04N 21/858* | (2011.01) | |

(52) U.S. Cl.
CPC ............ *H04N 21/233* (2013.01); *H04N 7/162* (2013.01); *H04N 21/2335* (2013.01); *H04N 21/2368* (2013.01); *H04N 21/2385* (2013.01); *H04N 21/2402* (2013.01); *H04N 21/25816* (2013.01); *H04N 21/439* (2013.01); *H04N 21/4722* (2013.01); *H04N 21/8133* (2013.01); *H04N 21/858* (2013.01)

(58) Field of Classification Search
CPC ............ H04N 21/233; H04N 21/2335; H04N 21/2368; H04N 21/2385; H04N 21/2402; H04N 21/25816; H04N 21/439; H04N 21/4722; H04N 21/8133; H04N 21/858
See application file for complete search history.

(56) References Cited

U.S. PATENT DOCUMENTS

| | | | | |
|---|---|---|---|---|
| 8,862,255 | B2 * | 10/2014 | Story | G06F 3/0488 |
| | | | | 700/94 |
| 8,949,902 | B1 * | 2/2015 | Fabian-Isaacs et al. | 725/52 |
| 2002/0047946 | A1 * | 4/2002 | Yuen | H04N 5/60 |
| | | | | 725/39 |
| 2003/0120744 | A1 * | 6/2003 | Kessler | 709/217 |
| 2006/0037037 | A1 * | 2/2006 | Miranz | 725/2 |
| 2010/0153999 | A1 * | 6/2010 | Yates | H04N 21/472 |
| | | | | 725/39 |
| 2010/0186034 | A1 * | 7/2010 | Walker | 725/40 |
| 2011/0138433 | A1 * | 6/2011 | Whiteing | H04N 21/233 |
| | | | | 725/114 |

* cited by examiner

*Primary Examiner* — Pankaj Kumar
*Assistant Examiner* — Alexander Boyd

(57) ABSTRACT

A disclosed system and method relate to presenting a program guide that includes information associated with an instance of programming, including audio information and visual information. A request for the information associated with the instance of programming is received, and a determination is made whether delivery of the first audio information could be completed within a threshold time after receiving the request. The audio information is provided to a user in connection with the visual information when the delivery of the first audio information could be completed within the threshold time. Alternatively, when the delivery of the first audio information could not be completed within the first threshold time, other audio information associated with the instance of the programming is obtained and provided to the user in connection with the visual information.

20 Claims, 9 Drawing Sheets

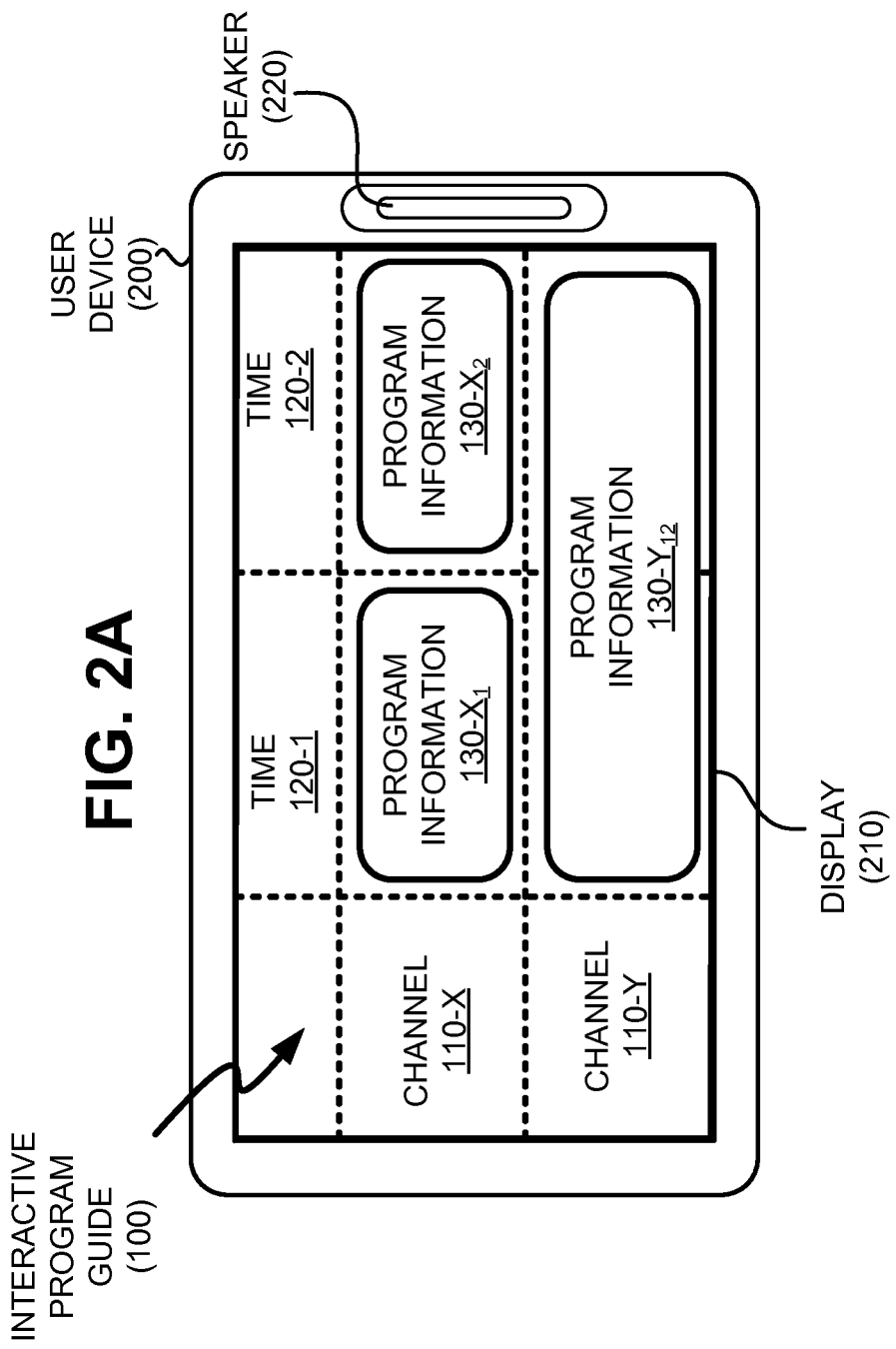

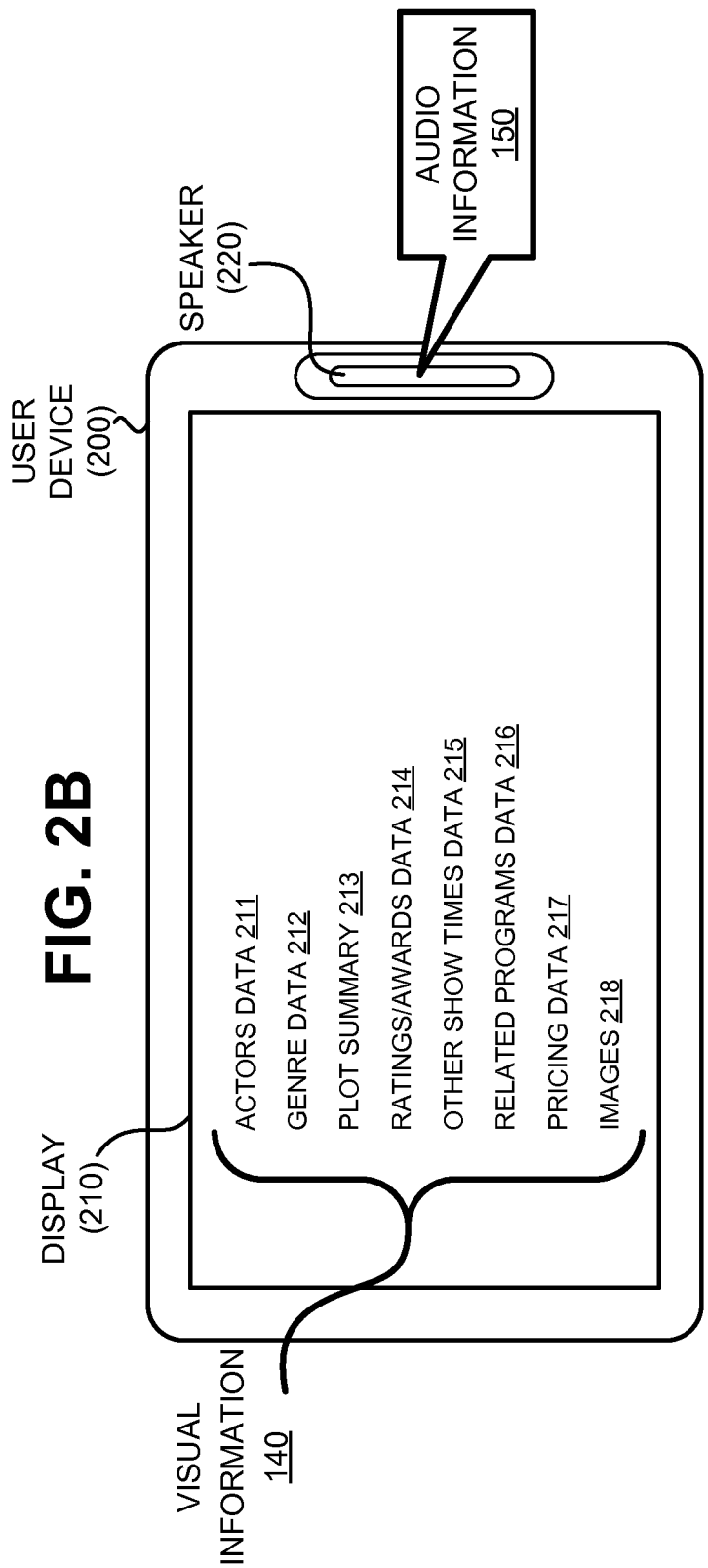

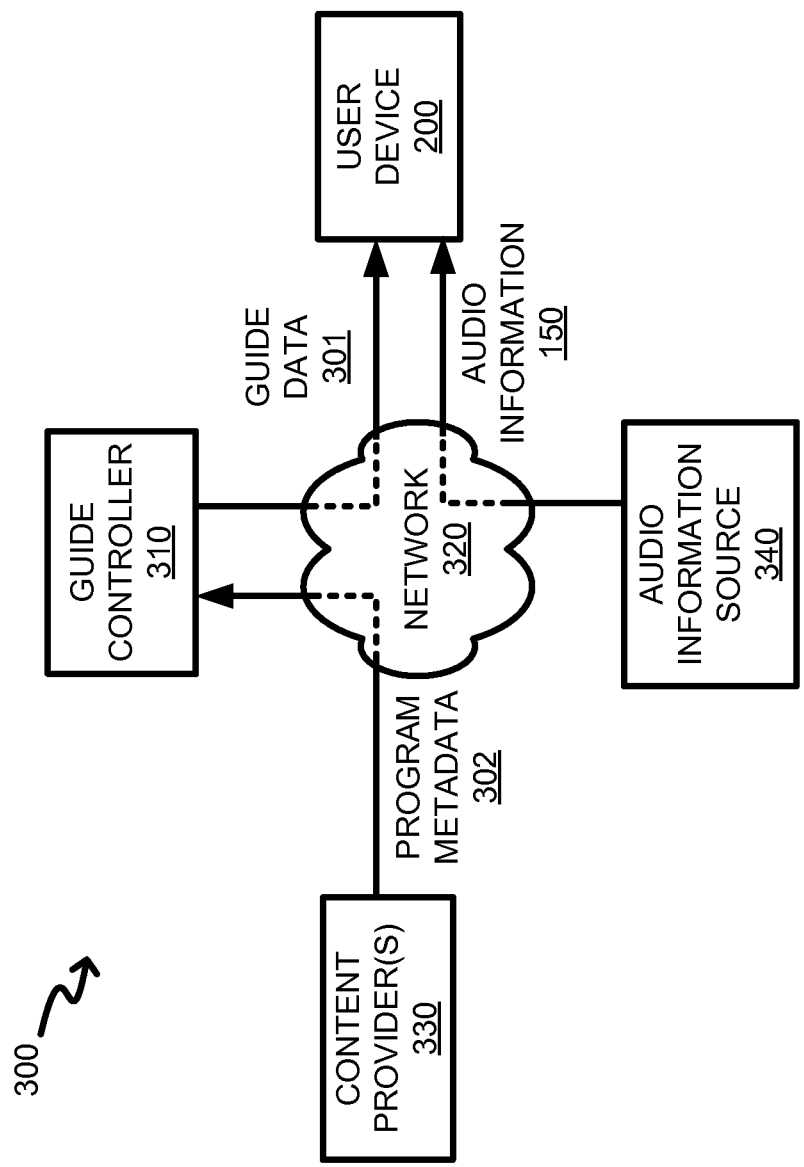

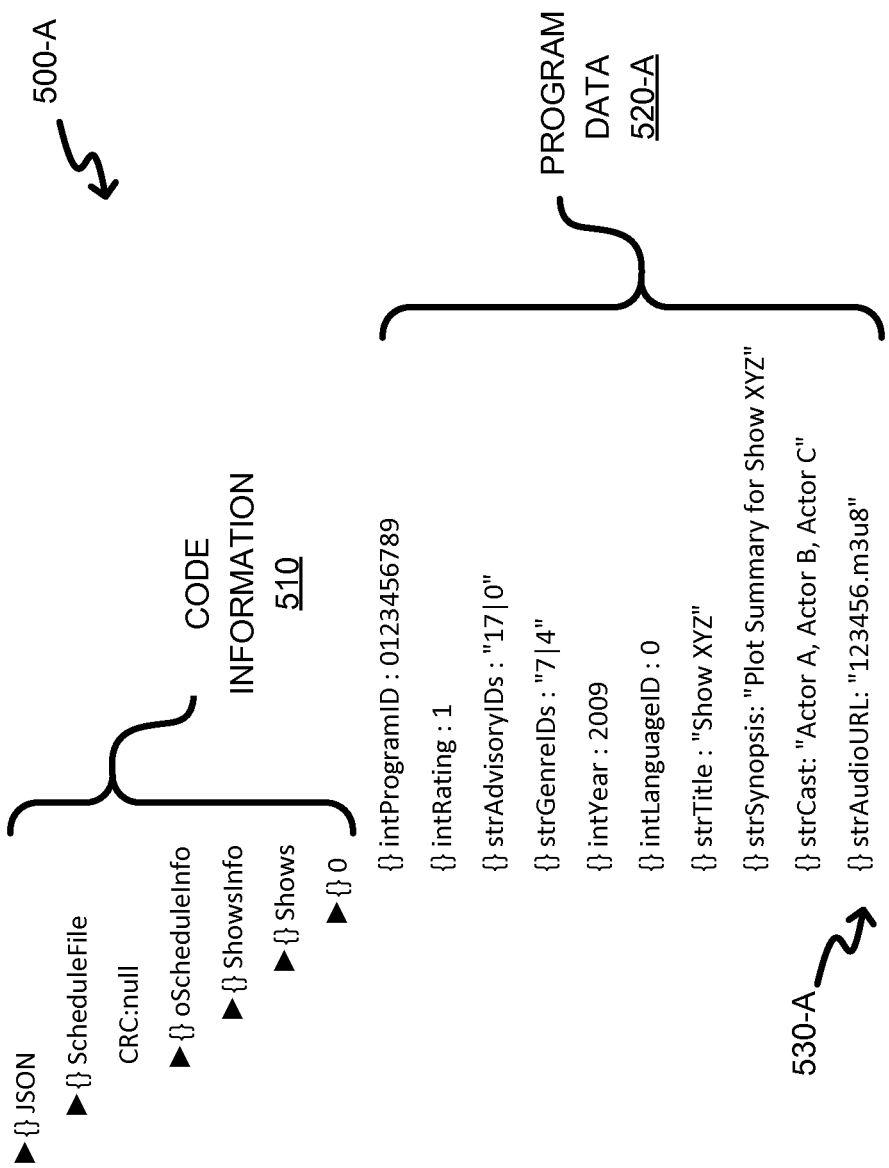

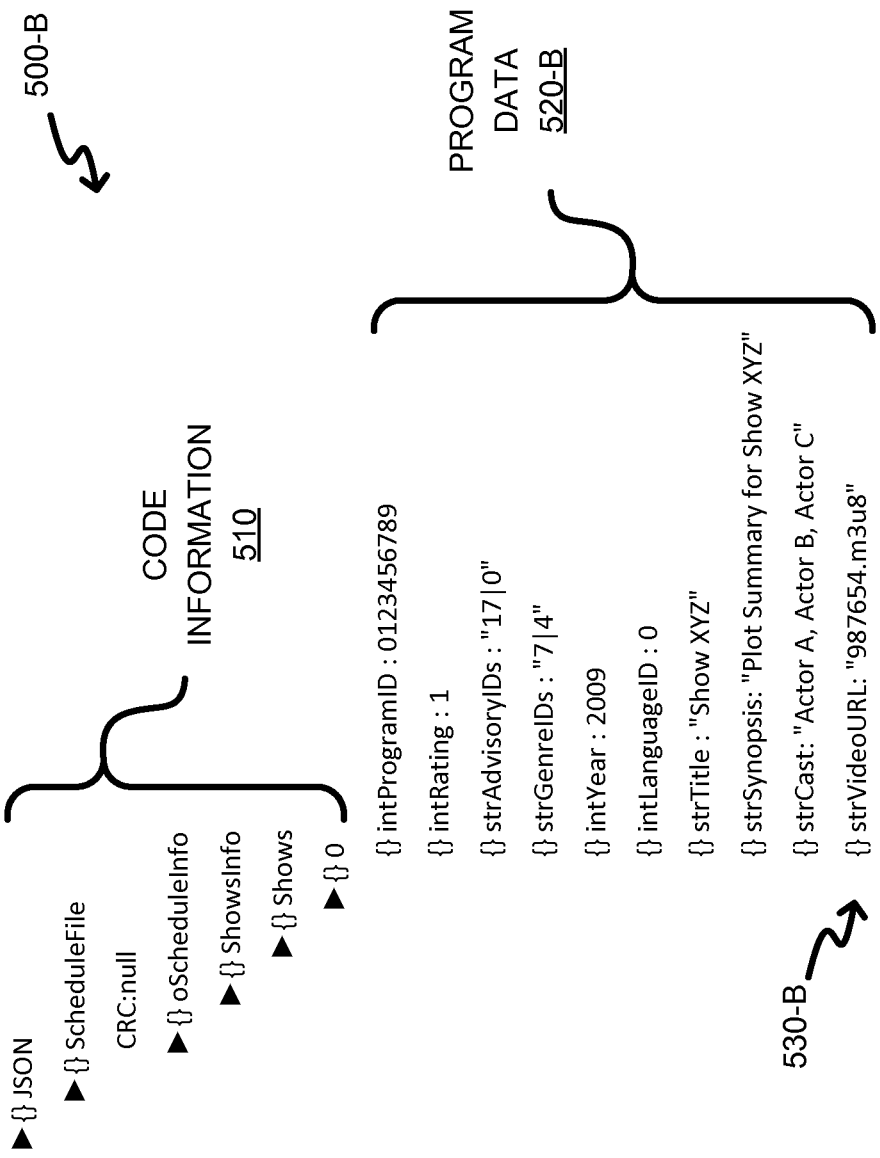

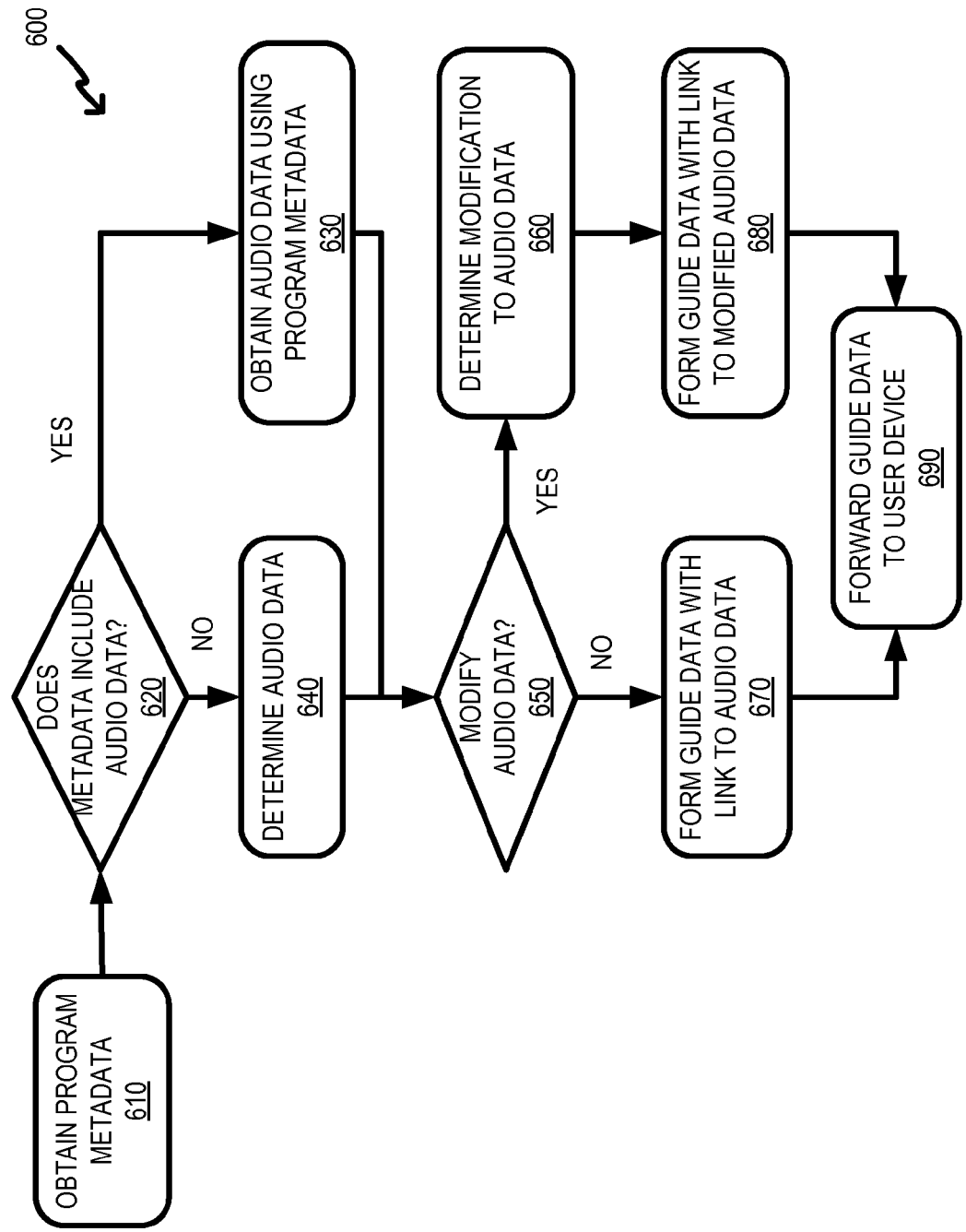

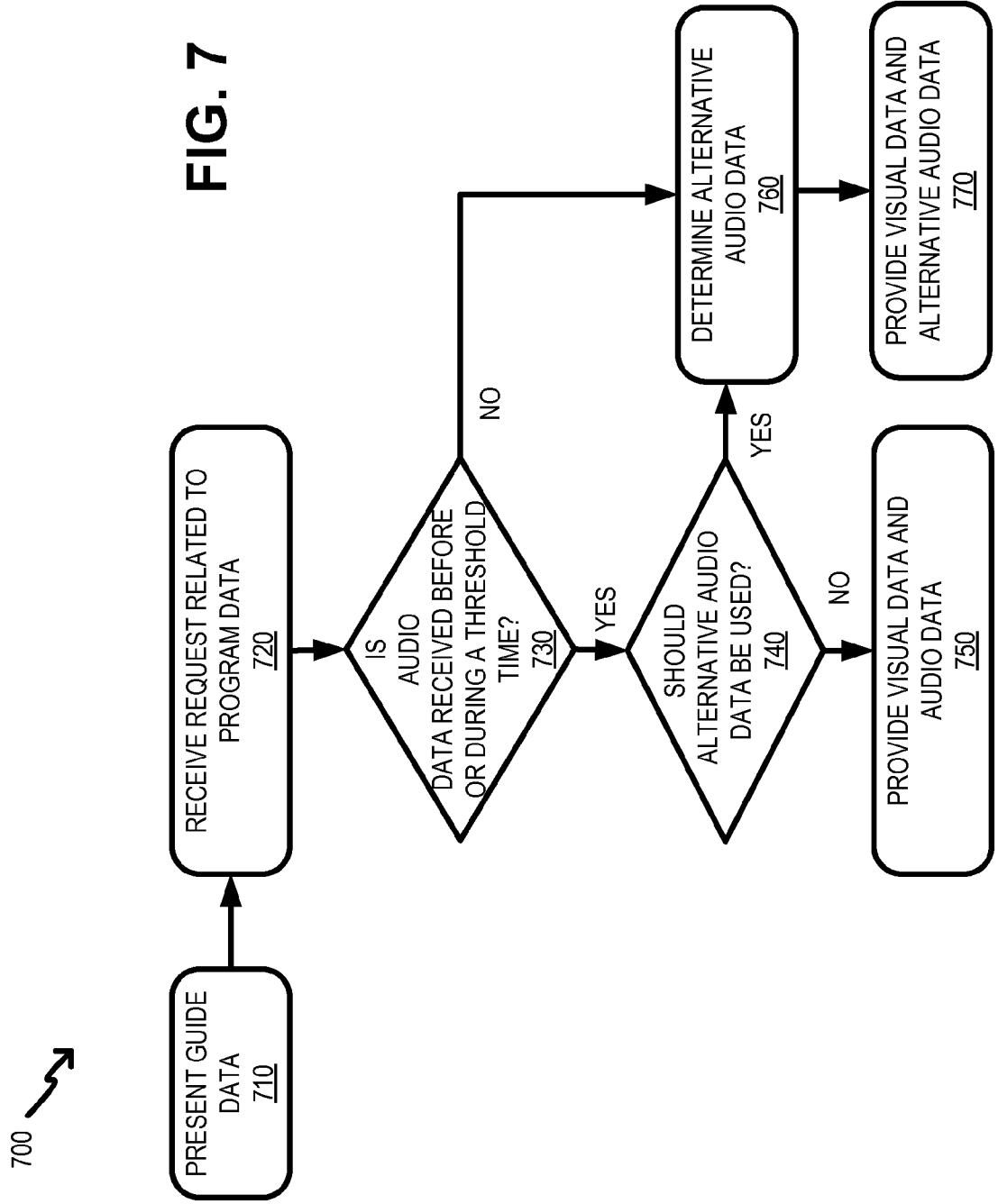

MULTIMEDIA PROGRAM INFORMATION

BACKGROUND

Interactive program guides (IPGs), also called electronic program guides (or EPGs), may be available through televisions (e.g., through set-top boxes), mobile phones, or the web. An IPG allows users to navigate scheduling information menus interactively to select programming, for example, by time, title, channel, and/or genre using an input device such as a keypad, a computer keyboard, or a remote control. For example, an IPG may be a graphical user interface (GUI) that includes a grid, or table, listing channel names and program titles and times, and the GUI may allow a user to navigate the grid to view information associated with available programming. The IPG may further allow a user to request additional information or to perform certain actions regarding a selected listing. For example, a user may use an IPG to request additional information regarding particular programming and/or to select the particular programming to record with digital video recorder (DVR), also known as personal video recorder (PVR).

Listings data for an IPG may be received in connection with a channel's transport stream, or alongside in a special data stream. For example, Advanced Television Systems Committee (ATSC) digital television transmissions may include program and system information protocol (PSIP) data carrying metadata about channels in ATSC broadcast transport streams, and an IPG may be populated using the PSIP data.

BRIEF DESCRIPTION OF THE DRAWINGS

FIGS. 2A and 2B show an exemplary user device that may provide the IPG shown in FIG. 1;

FIG. 3 shows an exemplary environment for providing the IPG shown in FIG. 1 to the user device shown in FIG. 2;

FIGS. 5A and 5B shows exemplary portions of code associated with the IPG shown in FIG. 1;

FIG. 6 shows a flow diagram of an exemplary process for generating the IPG shown in FIG. 1; and FIG. 7 shows a flow diagram of an exemplary process for presenting the IPG shown in FIG. 1.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations discussed herein relate to presenting a program guide, such as an IPG, that includes information associated with an instance of programming, including audio information and visual information. A request for the information associated with the instance of programming is received, and a determination is made whether delivery of the first audio information could be completed within a threshold time after receiving the request. The audio information is provided to a user in connection with the visual information when the delivery of the first audio information could be completed within the threshold time. Alternatively, when the delivery of the first audio information could not be completed within the first threshold time, other audio information associated with the instance of the programming is obtained and provided to the user in connection with the visual information.

As used herein, the term "user" is intended to be broadly interpreted to include a user device or a person using the user device, and the terms "user," "consumer," "subscriber," and/or "customer" may be used interchangeably. Furthermore, the term "programming" may be used to refer generally to any television program, on-demand program, pay-per-view program, broadcast media program, video on demand (VOD) program, commercial, advertisement, video, multimedia, movie, song, photograph, audio programming, network services (e.g., Internet), or any segment, portion, component, or combination of these or other forms of media content that may be presented to and experienced (e.g., viewed and/or heard) by a user.

Figure 1:
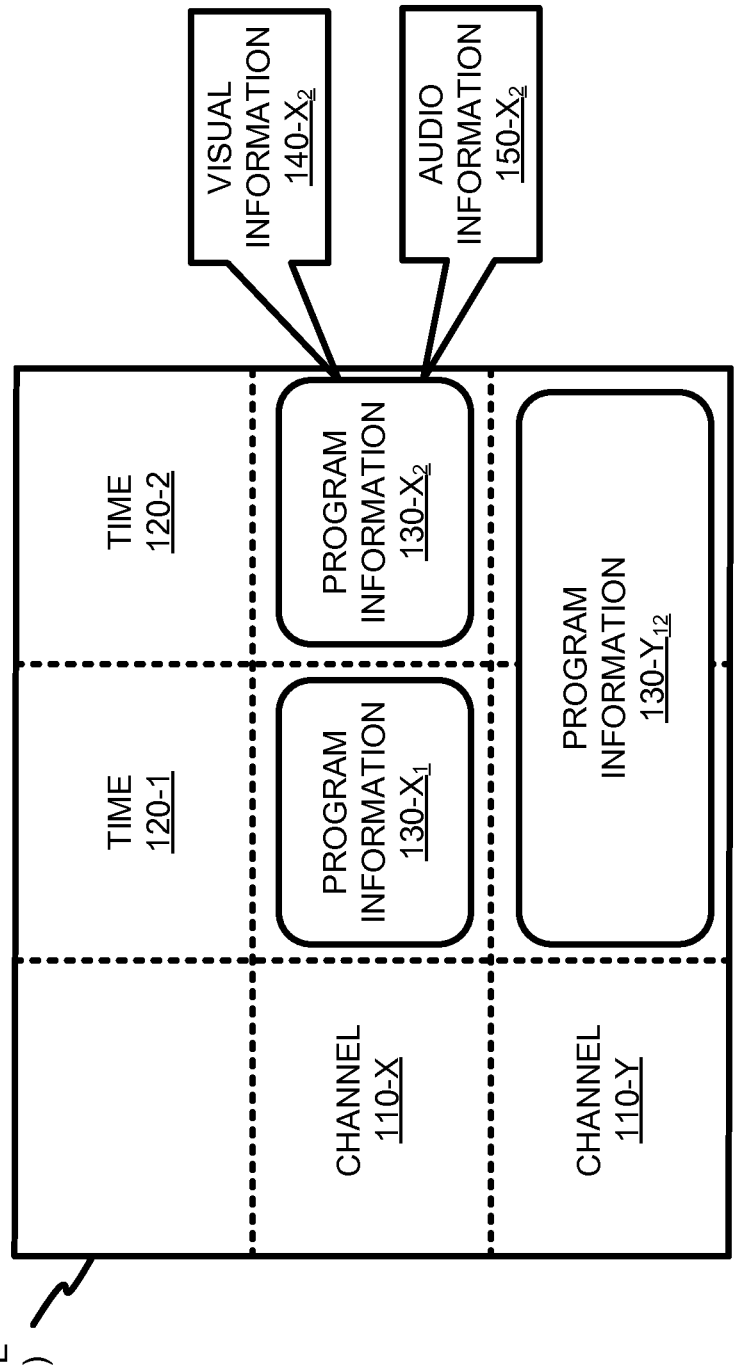
FIG. 1 shows an exemplary interactive program guide (IPG) that may be provided in one implementation.

FIG. 1 shows an exemplary interactive program guide (IPG) 100 that may be provided in one implementation. As shown in FIG. 1, IPG 100 may be a table or other user interface that identifies different channels 110 (shown in FIG. 1 as channels 110-X and 110-Y) and different program presentation times 120 (shown in FIG. 1 as times 120-1 and 120-2). IPG 100 may further include program information 130 (shown in FIG. 1 as program information 130-$X_1$ related to instances of programming (i.e., digital content) presented on channel 110-X during time 120-1, program information 130-$X_2$ related to programming on channel 110-X during time 120-2, and program information 130-$Y_{12}$ related to programming on channel 110-Y during times 120-1 and 120-2). Program information 130 may include, for example, a title or other identifier associated with the corresponding instance of the programming (i.e., the programming being presented on a particular channel at a particular time).

When using IPG 100, a user may select (e.g., by submitting a corresponding user input such as pressing a key on a remote control (or other input device) or mousing over a corresponding region of IPG 100) particular program information 130 for programming on a particular channel 110 at a particular time 120. The user may also request (e.g., by submitting another user input such as pressing a different key on the remote control or other input device or mousing over a different region of IPG 100) program information 130 for programming on a different channel 110 and/or different time 120. For example, a user may cause IPG 100 to scroll to present programming information for the different channel 110 and/or the different time 120.

Continuing with FIG. 1, in implementations described herein, a selection of one of the program information entries 130 in IPG 100 may cause visual information 140 to be displayed to the user and audio information 150 to be audibly presented to the user. Visual information 140 may include, for example, additional textual and/or image information associated with the programming (e.g., information regarding the programming and/or the programming instance that differs from programming information 130). Audio information 150 may include, for example, an audio representation of program information 130 and/or visual information 140. Additionally or alternatively, audio information 150 may include separate information that differs from program information 130 and visual information 140, such as an excerpt from the selected programming, promotional information, and/or other audio information.

In the example shown in FIG. 1, a user's selection of program information 130-$X_2$ (i.e., information associated with particular programming on channel 110-X at time 120-2) may cause IPG 100 to present visual information 140-$X_2$ and audio information 150-X$_2$ associated with the particular programming instance associated with program information 130-X$_2$. For example, visual information 140-X$_2$ and audio information 150-X$_2$ may be rendered.

It should be appreciated, however, that IPG 100 in FIG. 1 is provided merely for purposes of simplicity and the illustrated configuration of IPG 100 in FIG. 1 and the particular quantities of channels 110, times 120, and program information 130 included in IPG 100 in FIG. 1 are provided for explanatory or exemplary purposes only. In practice, a displayed IPG 100 may include additional or fewer channels 110, times 120, and/or program information 130 or different channels 110, times 120, and/or program information 130 than that which is illustrated in FIG. 1. Furthermore, IPG 100 may be modified to include additional and/or fewer entries of information than those shown in FIG. 1. For example, IPG 100 may further include a region presenting information or content from programming recently accessed by a user or programming being provided on a channel selected via IPG 100.

As shown in FIGS. 2A and 2B, IPG 100 may be presented by an exemplary user device 200 (shown in FIGS. 2A and 2B as a smart phone) that may include a display 210 and a speaker 220. As shown in FIG. 2A, display 210 may present at least a portion of IPG 100 (e.g., display channels 110, times 120, and program information 130). A user may select particular program information 130 in a portion of IPG 100 through user device 200. For example, display 210 may include a touch screen to receive a user input, such as a touch from a pointing device or a user's finger, selecting a region of display 210, and user device 200 may determine program information 130 corresponding to the selected region.

As shown in FIG. 2B, display 210 (or other interface device associated with user device 200) may present visual information 140 based on receiving the input selecting program information 130 in IPG 100. For example, as shown in FIG. 2B, visual information 140 may include actors' data 211 identifying actors in the programming, genre data 212 identifying a genre of the data, plot summary 213, ratings/awards data 214 identifying ratings and/or awards associated with the programming, other show times data 215, related programs data 216 identifying related and/or similar programs (e.g., programs in a similar genre), pricing data 217 identifying cost to access the programming through user device 200, and/or images 218 presenting images/videos extracted from or associated with the programming. It should be appreciated that the exemplary types of visual information 140 shown in FIG. 2B are provided merely for purposes of example, and that display 210 may present additional, fewer, or different types of visual information 140.

Continuing with FIG. 2B, speaker 220 (or other audio rendering device) may present audio information 150. For example, audio information 150 may include an audio file that is decoded by user device 200 and converted into an audio signal. Speaker 220 may include an electroacoustic transducer that produces sound in response to the audio signal.

In one implementation, user device 200 may coordinate the presentation of visual data 140 and audio information 150. For example, speaker 220 may provide audio information 150 that corresponds with images 218 presented by display 210 to form a multimedia presentation, such as a motion picture.

In one implementation, user device 200 may include a set-top box (STB) (not shown) that is connected to a separate display device (e.g., display 210). In other instances, user device 200 may be a routing device to distribute IPG 100 to multiple other devices within a customer premises, such as a home, office, or school.

User device 200 may include a communication interface (not shown) to receive programming from a content provider 330 (as discussed with respect to environment 300 in FIG. 3). User device 200 may further include an input interface (not shown) to receive input commands from a user input device. The user input device may include, for example, a remote control, keyboard, or any other suitable input device. The user input device may be configured to communicate with user device 200 via a wireless link (e.g., an IR link), electrical connection, or any other suitable communication link.

In some examples, the user input device may be a remote control device that enables a user to provide various commands and other input signals for controlling various settings and operations of user device 200, including control options related to the viewing of the programming or selecting information from IPG 100. For example, the user input device may include rewind and fast-forward commands that enable a user to access different scenes or frames within programming stored in a live cache buffer. The user input device may also include a record command that enables the user to cause an instance of programming to be recorded in a buffer. The user input device may further include a pause command that enables the user to pause an instance of programming. The user input device may additionally include a program guide command that evokes the display of IPG on display 210. Directional commands, for example specified by "left arrow", "right arrow", "up arrow", and "down arrow" buttons, may enable the user to navigate through various views and menus of IPG 100 displayed on the display 210. In some cases, user device 200 may include an interface to perceive or otherwise receive input gestures from a user (such as hand, head, eye, or body movements) and to determine input commands based on the received gestures.

It should be appreciated, however, that the simple user device 200 example in FIGS. 2A and 2B is provided for purposes of enhanced clarity of presentation. In practice, user device 200 may include additional, fewer, or different components than those shown in FIGS. 2A and 2B. For example, as described below with respect to FIG. 4 user device 200 may further include wired and/or wireless interface to receive IPG 100, visual data 140, and/or audio information 150.

FIG. 3 is a diagram of an exemplary environment 300 in which systems and/or methods described herein may be implemented. As shown in FIG. 3, environment 300 may include a guide controller 310 that provides guide data 301 to user device 200 via a network 320. In environment 300, guide controller 310 may cause guide data 301 to be downloaded and/or streamed to user device 200. For example, guide controller 310 may forward guide data 301 to user device 200 based on receiving an input from user device 200 (e.g., a user selection of a "guide" button on a remote control associated with user device 200 requesting IPG 100). Alternatively, guide controller 310 may automatically forward (or push) guide data 301 to user device 200 without receiving any type of request from user device 200. As described herein, guide data 301 may include audio information 150 and/or information (e.g., a link) that enables user device 200 to obtain audio information 150 from an audio information source 340.

Guide controller 310 may form guide data 301 based on program metadata 302 received from one or more content providers 330 and/or from another source. Guide controller 310 and/or user devices 200 may further receive digital content associated with the instances of programming from content provider 330. The guide controller 310, user device 200, and content provider 330 may communicate using various communication technologies, devices, media, and protocols supportive of remote data communications, including, but not limited to, cable networks, subscriber television networks, satellite networks, the Internet, intranets, local area networks, wireless networks (e.g., mobile telephone networks), optical fiber networks, data transmission media, communications devices, Transmission Control Protocol ("TCP"), Internet Protocol ("IP"), File Transfer Protocol ("FTP"), Telnet, Hypertext Transfer Protocol ("HTTP"), socket connections, Ethernet, video codecs including H.323, MPEG3, MPEG4, AVI, WMV, and SWF, and other suitable communications networks and technologies.

In one implementation, guide controller 310 may process the programming provided by the content provider 330 and provide a signal to user device 200 that includes guide data 301. Guide controller 310 may further process program metadata 302 to generate guide data 301 that user device 200 may use to provide IPG 100. User device 200 may receive and process output signals from guide controller 310 for presentation of the media content and IPG 100.

Guide data 301 may include content, instructions, programming, information location, etc. that enables user device 200 to form and present IPG 100, visual information 140, and/or audio information 150. Guide data 301 may include information corresponding to instances of programming (i.e., media content being broadcast, streamed, or otherwise available to users). For example, guide data 301 may include information describing instances of the programming, such as a title, a program summary, included actors, start and end time, and/or any additional cost associated with the instance of the programming.

Network 320 may include one or more wired and/or wireless networks that are capable of exchanging information related to voice, video, documents, multimedia, text, etc. (e.g., guide data 301 and/or program metadata 302). For example, network 320 may include one or more public switched telephone networks (PSTNs) or another type of switched network. Additionally or alternatively, network 320 may further include one or more packet switched networks, such as an Internet protocol (IP) based network, a local area network (LAN), a wide area network (WAN), a personal area network (PAN), an intranet, the Internet, or another type of network that is capable of exchanging information. For example, network 320 may include a private packet-switched network, a cable television network (e.g., a hybrid fiber-coax network), a wireless broadcast network (e.g., a satellite media broadcasting network or terrestrial broadcasting network), a telephone network, a provider-specific network (e.g., a Verizon® FIOS® network), an optical fiber network, or any other suitable network. Network 320 may also include a number of transmission towers for receiving wireless signals and forwarding the signals toward the intended destination.

Content provider 330 may provide digital content associated with the instances of the programming and/or program metadata 302 associated with the provided programming. Content provider 330 may communicate with guide controller 310 via one or more types of networks and communications links. For example, guide controller 310 and content provider 330 may communicate via network 320. While FIG. 3 shows a single content provider 330, environment 300 may include multiple content providers 330. For example separate content providers 330 may provide program metadata associated with different channels 110.

Audio information source 340 may provide audio information 150 to user device 200. For example, information source 340 may be a web server, an application server, a content server, etc. that user device may access to obtain audio information 150 using a URL or link included in guide data 301. Audio information source 340 and user device 200 may communicate via one or more types of networks, such as network 320. While FIG. 3 shows a single audio information source 340, environment 300 may include multiple audio information sources 340. For example, different audio information sources 340 may provide audio information 150 associated with different programs.

The quantity of devices and/or networks in environment 300, as illustrated in FIG. 3, is provided for explanatory purposes only. In practice, environment 300 may include additional devices and/or networks, fewer devices and/or networks, different devices and/or networks, or differently arranged devices and/or networks than those illustrated in FIG. 3. Also, in some implementations, one or more of the devices of environment 300 may perform one or more functions described as being performed by another one or more of the devices of environment 300. Devices of environment 300 may interconnect via wired connections, wireless connections, or a combination of wired and wireless connections.

Figure 4:
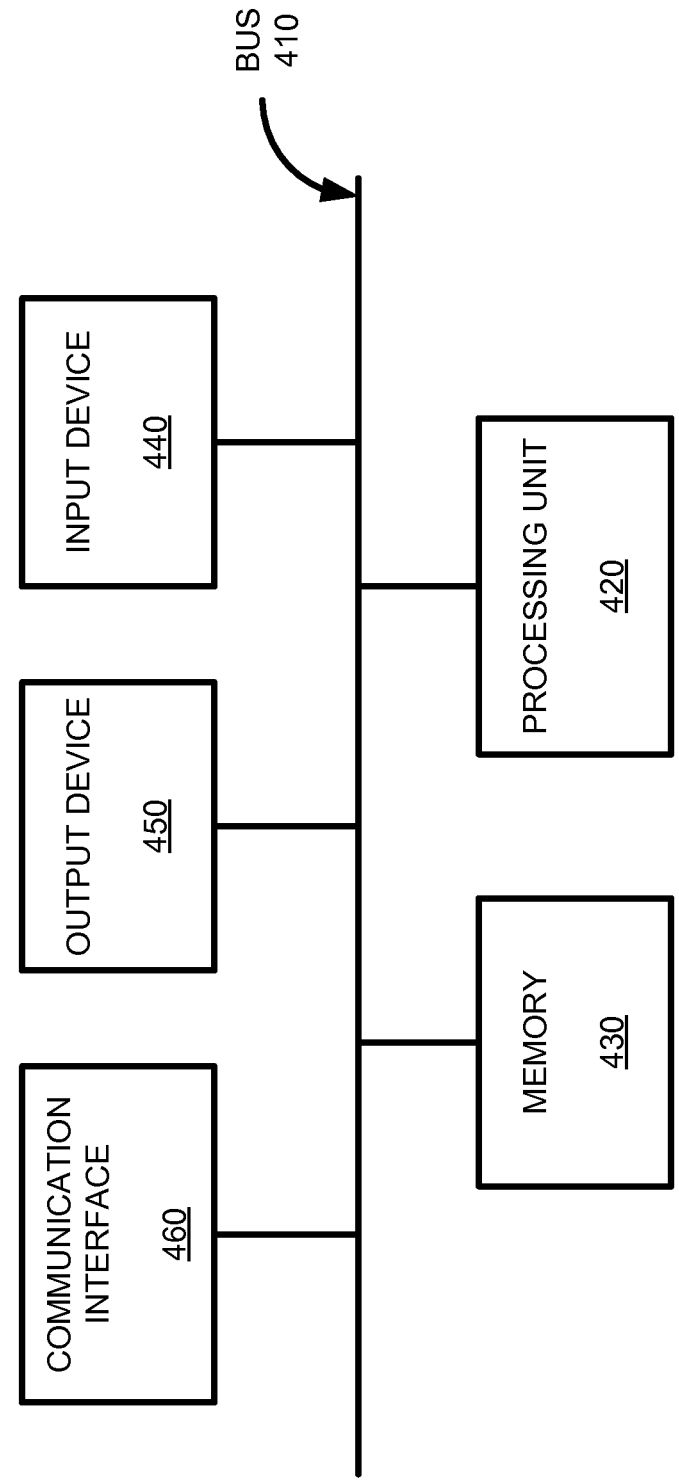
FIG. 4 shows a diagram of exemplary components that may be included in a device in the environment shown in FIG. 3.

FIG. 4 is a diagram illustrating exemplary components of a computing device 400. Computing device 400 may correspond, for example, to user device 200, guide controller 310, a component of network 320, content provider 330, audio information source 340, etc. Alternatively or additionally, user device 200, guide controller 310, the component of network 320, content provider 330, etc. may include two or more devices 400 and/or one or more components of computing device 400. As shown in FIG. 4, computing device 400 may include a bus 410, a processor 420, a memory 430, an input component 440, an output component 450, and a communication interface 460.

Bus 410 may include a path that permits communication among the components of computing device 400. Processor 420 may include a processor, a microprocessor, or processing logic that may interpret and execute instructions. Memory 430 may include any type of dynamic storage device that may store information and instructions, for execution by processor 420, and/or any type of non-volatile storage device that may store information for use by processor 420.

Input component 440 may include a mechanism that permits a user to input information to computing device 400, such as a keyboard, a keypad, a button, a switch, etc. Output component 450 may include a mechanism that outputs information to the user, such as a display, a speaker, one or more light emitting diodes (LEDs), etc. Communication interface 460 may include any transceiver-like mechanism that enables computing device 400 to communicate with other devices and/or systems via wireless communications, wired communications, or a combination of wireless and wired communications. For example, communication interface 460 may include mechanisms for communicating with another device or system via a network, such as network 320. Alternatively or additionally, communication interface 460 may be a logical component that includes input and output ports, input and output systems, and/or other input and output components that facilitate the transmission of data to other devices.

Computing device 400 may perform certain operations in response to processing unit 420 executing software instructions contained in a computer-readable medium, such as memory 430. A computer-readable medium may be defined as a non-transitory memory device. A memory device may include space within a single physical memory device or spread across multiple physical memory devices. The software instructions may be read into memory 430 from another computer-readable medium or from another device. The software instructions contained in memory 430 may cause processor 420 to perform processes described herein. Alternatively, hardwired circuitry may be used in place of or in combination with software instructions to implement processes described herein. Thus, implementations described herein are not limited to any specific combination of hardware circuitry and software.

Computing device 400 may include fewer components, additional components, different components, and/or differently arranged components than those illustrated in FIG. 4. As an example, in some implementations, a display may not be included in computing device 400. In these situations, computing device 400 may be a "headless" device that does not include input component 440. Additionally, or alternatively, one or more operations described as being performed by a particular component of computing device 400 may be performed by one or more other components, in addition to or instead of the particular component of computing device 400.

FIGS. 5A and 5B show exemplary portions 500-A and 500-B (hereafter referred collectively as portions 500 or individually as portion 500) of IPG data 301. As shown in FIGS. 5A and 5B, portions 500 may include code information 510 and program data 520-A or 520-B (collectively or individually referred to as program data 520). Program data 520 may include a storage address 530-A or 530-B (collectively referred to as storage addresses 530 and individually as storage address 530) that identifies a uniform resource locator (URL) or other information associated with audio information 150.

Code information 510 may include information, code, instructions, etc, that indicate to user device 200 that portion 500 relates to IPG 100. In the examples shown in FIGS. 5A and 5B, portion 500 may include information indicating that IPG 100 is in a JavaScript Object Notation (JSON) format and that portion 500 relate to a "schedule file" that provides "schedule information" with "show information" about certain "shows." JSON is a text-based, human-readable format for representing simple data structures and associative arrays (also called objects). Other examples of a suitable format for portion 500 may include, for example, Extensible Markup Language (XML), HyperText Markup Language (HTML), extensible HyperText Markup Language (XHTML), Advanced Authoring Format (AAF) files, and Resource Description Framework (RDF) files.

In the examples shown in FIGS. 5A and 5B, program data 520 may include numerical data identifying a program identifier (ProgramID: 0123456789). The program identifier may correspond to a numerical code used by the service provider to identify the programming. Program data 520 may also include numerical data identifying a rating (intRating: 1), a year the programming was released (intYear: 2009), and a language identifier associated with the instance of the programming (intLanguageID: 0). In this example, intRating value of "1" may indicate that this program has a PG rating, and an intLanguageID value of "0" may indicate that the program is broadcast in English.

Program data 520 may further include information identifying character strings associated with advisory identifiers (strAdvisoryIDs: "1710"), a genre identifier (strGenreIDs: "714") a title (strTitle: "Show XYZ"), a synopsis (strSynopsis: "Plot Summary for Show XYZ"), and a cast (strCast: "Actor A, Actor B, Actor C").

Storage address 530 may be a Motion Pictures Export Group (MPEG) URL reference (m3u8) file (e.g., "123456.m3u8") or other data that identifies the location of one or more audio and/or multimedia files associated with audio information 150. In the example shown in FIG. 5A, storage address 530-A may identify the location of one or more audio files (e.g., identifies a location associated with audio information 150). In the example shown in FIG. 5B, storage address 530-B identifies the location of one or more multimedia files (e.g., identifies a location associated with at least a portion of visual data 140, such as images 218, and audio information 150).

Although FIGS. 5A and 5B depict exemplary elements of portion 500 of guide data 301, in other implementations, portion 500 may include fewer portions, additional portions, different portions, or differently arranged portions than those illustrated in FIGS. 5A and 5B. Furthermore, particular portions 500 are provided in FIGS. 5A and 5B for purposes of enhanced clarity of presentation, and code information 510, program data 520, and/or storage address 530 may include additional, fewer, or different information, format, etc. than that shown in FIGS. 5A and 5B.

FIG. 6 is a flow diagram illustrating an exemplary process 600 for forming IPG 100. In one implementation, portions of process 600 may be performed by guide controller 310. In other implementations, portions of process 600 may be performed by guide controller 310 in combination with one or more other devices, such as by user device 200, a component of network 320, and/or content provider 330, or by the or more other devices without the involvement of guide controller 310.

As shown in FIG. 6, process 600 may include obtaining metadata 610 related to an instance of programming (block 610). As previously described with respect to environment 300 in FIG. 3, guide controller 310 may receive program metadata 302 from content provider 330. For example, program metadata 302 may identify information related to instance of the programming, such as a title, genre, summary, cast, awards, future play times, etc.

In addition or alternatively, guide controller 310 may further collect and/or generate additional metadata related to the programming. For example, guide controller 310 may process digital content from content provider 330 to determine the metadata or may collect the metadata from another source, such as searching for metadata using a search engine or other data collection mechanism. In another example, guide controller 310 may determine data related to the programming with respect to a service provider, such as an associated cost; instructions for user device 200 to access the programming; times associated with prior/future instances of the programming on other channels available to user device 200 ratings given to the programming by other users of the service provider; etc.

After obtaining the programming metadata, guide controller 310 may determine whether the metadata includes audio data (block 620). For example, guide controller 310 may evaluate programming metadata 302 for audio data associated with the instance of the programming. For example, program metadata 302 may include an excerpt (e.g., a preview) of the programming. In addition or alternatively, program metadata 302 may include an audio version (e.g., a spoken version) of other information included in program metadata 302. When determining whether the metadata includes audio data in process block 620, guide controller 310 may determine whether a portion of the metadata includes data having a particular format, title, file extension, etc. For example, an audio files may include a ".wav" (waveform audio file format), ".mp3" (MPEG-2 Audio Layer III compressed audio file format), or other extension associated with audio and/or multimedia data.

In addition or alternatively, guide controller 310 may determine whether the metadata includes information identifying a location (e.g., a URL) where audio data 150 can be obtained. For example, guide controller 310 may determine whether any portion of program metadata 302 includes information identifying a host (e.g., or domain name) or an internet protocol (IP) address (e.g., program metadata 302 identifies an IP version 4 or IP version 6 address).

In another example, the program metadata may include a file (e.g., an m3u8 file) storing a location (e.g., URL) of the audio data and/or information (e.g., an address) identifying the file.

If the program metadata (e.g., program metadata 302) includes the audio data and/or a location to access the audio data (block 620-Yes), guide controller may obtain a location of the audio data using the information in the program metadata (block 630). For example, guide controller 310 may extract an address of the audio data from the program metadata 302 (e.g., by parsing the program metadata 302 and/or accessing a file identified or included in the metadata).

In another example, procedural block 630 may include guide controller 310 obtaining the audio data (e.g., directly from the metadata and/or from an address identified in the metadata) and storing the audio data to an associated storage device or buffer (not shown in FIG. 3). In this example, guide controller 310 may determine an address of the audio data with respect to the storage device, such as a network address of the storage device and/or a portion (e.g., a port) of the storage device that may be used to accessed store audio data.

If the audio data is not included in or identified in the metadata (block 620-No), guide controller 310 may determine the audio data (block 640). In one implementation, guide controller 310 may evaluate program metadata 302 to identify the audio data. For example, guide controller 310 may perform a text-to-voice conversion of portions of visual data 140 to form the audio information 150. In another example, guide controller 310 may parse the program metadata 302 to determine identifying information (such as a title) and then use the identifying information to locate related audio information 150, such as locating for a web site that provides an excerpt (e.g., a preview) and/or a commercial of identified programming and/or an audio discussion (e.g., review) related to the identified program. In addition or alternatively, controller 310 may parse the program metadata 302 to identify a cast member of the programming and then search for audio data associated with the cast member (e.g., an a recording of an interview, an excerpt from other programming that includes the cast member, etc.).

In other examples, guide controller 310 may determine audio data 150 in procedural block 640 based on other factors that are unrelated to the obtained programming metadata. For example, guide controller 310 may identify information associated with user device 200 (e.g., account information such as outstanding balances, weather or other environmental data for an associated location, compatibility/availability of the programming by user device 200 or other user devices 200 associated with the same user, configuration information, etc.

Continuing with process 600 in FIG. 6, guide controller 310 may determine whether to modify the determined audio data (block 650). For example, guide controller 310 may determine to modify the audio data if the rendered audio data (e.g., played through speaker 220) would be longer than a high threshold time and/or shorter than a low threshold time. The threshold time(s) may be a fixed amount or may be determined based on the amount of visual information 140. For example, the high and/or low threshold times may be determined based on an expected time to read the visual information 140.

In another example, guide controller 310 may determine whether to modify the audio data in procedural block 650 based on whether user device 200 is authorized to access a channel providing the instance of the programming. Guide controller 310 may determine to modify the audio data if the channel is otherwise unavailable to user device 200. For example, guide controller 310 may determine to modify the audio data to include instructions to subscribe to the channel. In another example, guide controller 310 may modify or remove the audio data if access to the channel is limited through user device 200, such as the channel being blocked by parental controls or other access restrictions.

If the audio data is to be modified (block 650-Yes), guide controller 310 may determine the modification to the audio data (block 660). For example, guide controller 310 may modify a playback speed (e.g., causing the audio data to be provided more quickly or more slowly) so that the audio data is provided for a desired time period. Alternatively or in addition, guide controller 310 may remove a portion of the audio data or add additional content so that the modified audio content is provided by user device 200 for a desired time period.

In another example, guide controller 310 may customize the audio data for user device 200. For example, guide controller 310 may determine audio data related to costs and/or instructions for accessing the programming through user device 200. In another example, guide controller 310 may determine audio instructions for user device 200 to access the channel providing the instance of the programming or identifying other channels available to user device 200 that provide other (future) instances of the programming. Guide controller may further modify the audio data to be compatible with user device 200.

If the audio data is modified in procedural step 660, guide controller 310 may identify a memory address associated with the modified data. For example, guide controller 310 may store the modified audio data (e.g., to a memory device), and guide controller 310 may determine a storage location associated with the modified data. Alternatively or in addition, guide controller 310 may locate a modified version of the audio data (e.g., an excerpt of a different portion of the programming) that conforms with desired parameters (e.g., a desired play length, desired content that conforms with parental controls, etc.). In another example, guide controller 310 may update an m3u8 file or other file identifying a location of the audio data to include a reference to the modified audio data and/or to remove a reference to the original audio data.

If the audio data is not modified (block 650-No), guide controller 310 may form guide data 301 with a link to audio data (block 670), and if the audio data is modified (block 650-Yes in combination with block 660), guide controller 310 may form guide data 301 with a link to the modified audio data (block 680). For example, as described with respect to FIGS. 5A and 5B, portions 500 of guide data 301 may include information identifying an m3u8 or other address file that includes or identifies addresses to the audio data. Guide controller 310 may further include information in guide data 301 related to program information 130, visual data 140, and audio information 150 for channels 110 at times 120.

Continuing with process 600 in FIG. 6, guide controller 310 may forward the guide data to user device 200 (block 690). As previously described with respect to FIG. 3, guide controller 310 may forward guide data 301 to user device 200 via network 320. For example, guide controller 310 may initiate a session to download or stream guide data 301 and other data (e.g., audio information 150) to user device 200. Since guide data 301 and/or audio information 150 may be large, guide controller 310 may schedule delivery during non-peak usage time periods in order to minimize network usage and traffic during peak usage times.

In one implementation, guide controller 310 may provide certain portions of guide data 301 (e.g., program information 130) at a certain time to user device and may then provide visual information 140 and/or audio information 150 at a later time. For example, guide controller 310 may initially provide a first portion of guide data 301 (e.g., program information 130) to user device 200, and user device 200 may present guide data 301. User device 200 may subsequently access and/or receive audio data 140 at a subsequent time, such as in response to a selection of particular program information 130 presented by user device 200 or at a future data delivery time.

FIG. 7 is a flow diagram illustrating an exemplary process 700 for presenting guide data 301 formed in process 600. In one implementation, portions of process 700 may be performed by user device 200. In other implementations, one or more portions of process 700 may be performed by user device 200 in combination with one or more other devices, such as guide controller 310, a component of network 320, and/or content provider 330, or by the one or more other devices without the involvement of user device 200.

As shown in FIG. 7, process 700 may include presenting a portion of guide data 301 (block 710) and receiving a request for program data 130 (block 720). For example, as previously described with respect to FIG. 2A, display 210 in user device 200 may present a portion of IPG 100 that includes program information 130 associated with channels 110 and time 120. As further described with respect to FIG. 2A, user device 200 may receive a user input (e.g., a touch on a touch-screen display 210 or other user input) selecting particular program information 130 (e.g., program information associated with an instance of a programming to be presented on a particular channel 110 at a particular time 120).

Based on receiving the request for program data associated with a particular instance of programming, user device 200 may determine if audio information 150 associated with the particular instance has been received or could be received within a threshold time (block 730). For example, user device 200 may determine whether audio information 150 is included within guide data 301 received from guide controller 310. In another example, user device 200 may determine whether audio information 150 has been previously received and buffered. For example, as described with respect procedural block 690, guide controller 310 may schedule delivery of audio information 150 at a particular time, and user device 200 may determine whether particular time has passed when the request is received.

In one implementation, user device 200 may determine, when delivery of the audio data is incomplete when the request for the program data is received in procedural block 720, whether the audio data can be acquired by user device 200 within a threshold time after receiving the request for the program data. For example, user device 200 may identify the size of an unreceived portion of audio information 150 (e.g., by determining a difference between a size of audio information 150 and a size of a previously received portion of audio information 150) and an available bandwidth. For example, user device 200 may determine the available bandwidth based on information received from network 320 and/or based on a bandwidth at which a portion of audio information 150 was previously received by user device 200. User device 200 may then determine an expected delivery time based on the size of the un-received portion of audio information 150 and the expected bandwidth. If no portion of audio information 150 was previously received, user device 200 may determine whether the entire audio information 150 can be received within a threshold amount of time based on the expected bandwidth.

In another implementation, user device 200 may further attempt to modify communications via network 320 (e.g., to audio information source 340) enable a previously non-received portion of audio information 150 to be received by user device 200 during the threshold time. For example user device 200 may try to reconfigure a data channel (e.g., increase bandwidth, buffer size, reliability, etc.) so that the un-received portion of audio information can be received during the threshold time. In this example, user device 200 may consider the delivery of audio information 150 to be deliverable within the threshold time if user device 200 can successfully modify the data channel.

If audio information 150 is received or could be received within the threshold time (block 730-Yes), user device 200 may determine whether alternative audio information 150 should be used (block 740). For example, user device 200 may determine to use the alternative audio information 150 if the original audio information 150, when rendered (e.g., played through speaker 220), would be longer than a high threshold time and/or shorter than a low threshold time. The threshold time(s) may be a fixed amount or may be determined based on the amount of visual information 140. For example, the high and/or low threshold times may be determined based on an expected time to read the visual information 140.

In another example, user device 200 may determine to use alternative audio information in procedural block 740 based on whether user device 200 is authorized to access a channel providing the instance of the programming. User device 200 may determine to use alternative audio information 150 if user device 200 does not subscribe to the associated channel 110 or if the associated channel 110 is otherwise unavailable to user device 200. In another example, user device 200 may determine to use the alternative audio information 150 if access to the associated channel 110 is limited through user device 200, such as the associated channel 110 being blocked by parental controls or other access restrictions.

If the delivery of the audio data to user device 200 is complete or could be completed during the threshold time (block 730-Yes) and user device 200 determines to use the received audio information 150 (block 740-No), user device 200 may provide audio information 150 in connection with visual information 140 (block 750). For example, as previously described with respect to FIG. 2B, user device 200 may include both display 210 to present visual data 140 and speaker 220 to present audio information 150.

If the delivery of the audio data to user device 200 is not complete or could not be completed during a threshold time (block 730-No) or user device 200 determines to use alternative audio information 150 (block 740-Yes), user device 200 may determine the alternative audio information 150 (block 760) and may provide the alternative audio information 150 in connection with visual information 140 (block 770) as described with respect to FIG. 2B. For example, user device 200 may determine the alternative audio information 150 based on visual data 140, such as performing a text-to-speech conversion of the visual data 140. In another example, user device 200 may determine alternative audio information 150 that may be used with multiple different visual data 140 (e.g., visual data 140 for different programming and/or instances of the programming). For example, user device 200 may store default alternative audio information 150, such as commercial data related to the service provider, that may be provided with different sets of different visual data 140.

While a series of blocks has been described with respect to FIGS. 6 and 7, the order of the blocks in processes 600 and 700 may be modified in other implementations. Furthermore, non-dependent blocks may be performed in parallel. Furthermore, processes 600 and 700 may include additional and/or fewer blocks than shown in FIGS. 6 and 7. For example, guide controller 310 may determine whether user device 200 is compatible with audio information 150, and if user device 200 is not compatible with audio information 150, controller 310 may modify audio information 150 (e.g., convert audio information to different audio format compatible with user device 200) and/or locate alternative audio information 150.

Various preferred embodiments have been described herein with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

It will be apparent that different aspects of the description provided above may be implemented in many different forms of software, firmware, and hardware in the implementations illustrated in the figures. The actual software code or specialized control hardware used to implement these aspects is not limiting of the implementations. Thus, the operation and behavior of these aspects were described without reference to the specific software code—it being understood that software and control hardware can be designed to implement these aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   presenting, by a processor, a program guide, wherein the program guide includes information associated with an instance of programming;
   receiving, by the processor, a request from a user for the information associated with the instance of programming, wherein the information includes first audio information and visual information;
   determining, by the processor, whether delivery of the first audio information could be completed during a first threshold time after receiving the request and whether the first audio information, when rendered, would be shorter than a second threshold time or longer than a third threshold time that is greater than the second threshold time;
   determining, by the processor, whether to use second audio information associated with the instance of the programming, wherein the first audio information is provided to the user in connection with the visual information based on determining to not use the second audio information, wherein the second audio information is used when the delivery of the first audio information could not be completed within the first threshold time or when the rendered first audio information is shorter than the second threshold time or longer than the third threshold time;
   modifying, by the processor and based on determining to use the second audio information, the first audio information to form the second audio information, wherein modifying the first audio information includes modifying a playback speed of the first audio information, and wherein the second audio information, when rendered, is longer than the second threshold time and shorter than the third threshold time; and
   providing, by the processor and based on determine to use the second audio information, the second audio information, and not the first audio information, to the user in connection with the visual information.

2. The method of claim 1, further comprising:
   determining whether the user is authorized to receive a channel associated with the instance of the programming, wherein the second audio information is determined to be used further based on the determining that the user is not authorized to receive the channel associated with the instance of the programming.

3. The method of claim 1, wherein determining whether the delivery of the first audio information could be completed within the first threshold time after receiving the request includes:
   determining an undelivered portion of the first audio information;
   identifying a size of the undelivered portion of the first audio information;
   determining an expected bandwidth for a channel carrying the first audio information;
   determining the expected delivery time based on the size of the undelivered portion of the first audio information and the expected bandwidth for the channel; and
   determining whether the expected delivery time occurs during the first threshold time, wherein the delivery of the first audio information could be completed within the first threshold time when the expected delivery time occurs during the first threshold time.

4. The method of claim 3, wherein determining whether the delivery of the first audio information could be completed within the first threshold time after receiving the request further includes:
   initiating, when the expected delivery time occurs after the first threshold time, a modification to the channel;
   determining a modified expected bandwidth associated with the modified channel;
   determining a modified expected delivery time based on the size of the undelivered portion of the first audio information and the modified expected bandwidth for the channel; and
   determining whether the modified expected delivery time occurs during the first threshold time, wherein the delivery of the first audio information could be completed within the first threshold time when the modified expected delivery time occurs during the first threshold time.

5. The method of claim 1, further comprising:
   receiving guide data associated with the program guide, wherein the guide data includes the visual information and a first link to the first audio information, and wherein the first audio information is acquired using the first link.

6. The method of claim 5, wherein the guide data includes JavaScript Object Notation (JSON) code, wherein the JSON code includes the first link, wherein the method further includes:

identifying a second link associated with the accessing the second audio information; and replacing, in the JSON code, the first link with the second link.

7. The method of claim 1, wherein modifying the first audio information further includes:

removing a portion of the first audio information when the rendered first audio information is longer than the third threshold time; and adding additional content to the first audio information when the rendered first audio information is shorter than the second threshold time.

8. A system comprising:

a memory configured to store instructions; and a processor configured to execute one or more of the instructions to:

present a program guide, wherein the program guide includes information associated with an instance of programming, receive a request from a user for the information associated with the instance of programming, wherein the information includes first audio information and visual information, determine whether delivery of the first audio information could be completed during a first threshold time after receiving the request and whether the first audio information, when rendered, would be shorter than a second threshold time or longer than a third threshold time that is greater than the second threshold time, determine whether to use second audio information associated with the instance of the programming, wherein the first audio information is provided to the user in connection with the visual information based on determining to not use the second audio information, wherein the second audio information is used when the delivery of the first audio information could not be completed within the first threshold time or when the rendered first audio information is shorter than the second threshold time or longer than the third threshold time, modify, based on determining to use the second audio information, the first audio information to form the second audio information, wherein modifying the first audio information includes modifying a playback speed of the first audio information, and wherein the second audio information, when rendered, is longer than the second threshold time and shorter than the third threshold time, and provide, based on determining to use the second audio information, the second audio information, and not the first audio information, to the user in connection with the visual information.

9. The system of claim 8, wherein the processor is further configured to execute the one or more instructions to:

schedule delivery of the first audio information at a particular time, wherein the processor determines to use the second audio information further based on the request being received before the particular time.

10. The system of claim 8, wherein the processor is further configured to execute the one or more instructions to:

determine whether the user is authorized to receive a channel associated with the instance of the programming, wherein the processor determines to use the second audio information further based on the determining that the user is not authorized to receive the channel associated with the instance of the programming.

11. The system of claim 8, wherein the processor, when determining whether the delivery of the first audio information could be completed within the first threshold time after receiving the request, is further configured to execute the one or more instructions to:

determine an undelivered portion of the first audio information, identify a size of the undelivered portion of the first audio information, determine an expected bandwidth for a channel carrying the first audio information, determine the expected delivery time based on the size of the undelivered portion of the first audio information and the expected bandwidth for the channel, and determine whether the expected delivery time occurs during the first threshold time, wherein the processor determines that the delivery of the first audio information could be completed within the first threshold time when the expected delivery time occurs during the first threshold time.

12. The system of claim 11, wherein the processor, when determining whether the delivery of the first audio information could be completed within the first threshold time after receiving the request, is further configured to execute the one or more instructions to:

initiate, when the expected delivery time occurs after the first threshold time, a modification to the channel, determine a modified expected bandwidth associated with the modified channel, determine a modified expected delivery time based on the size of the undelivered portion of the first audio information and the modified expected bandwidth for the channel, and determine whether the modified expected delivery time occurs during the first threshold time, wherein the processor determines that the delivery of the first audio information could be completed within the first threshold time when the modified expected delivery time occurs during the first threshold time.

13. The system of claim 8, wherein the processor is further configured to execute the one or more instructions to:

receive guide data associated with the program guide, wherein the guide data includes the visual information and a first link to the first audio information, and wherein the first audio information is acquired using the first link.

14. The system of claim 8, wherein the system is included in a set-top box.

15. A computer-readable memory to store instructions comprising:

one or more instructions that, when executed by a processor, cause the processor to:

present a program guide, wherein the program guide includes information associated with an instance of programming, receive a request from a user for the information associated with the instance of programming, wherein the information includes first audio information and visual information, determine whether delivery of the first audio information could be completed during a first threshold time after receiving the request and whether the first audio information, when rendered, would be shorter than a second threshold time or longer than a third threshold time that is greater than the second threshold time, determining, by the processor, whether to use second audio information associated with the instance of the programming, wherein the first audio information is provided to the user in connection with the visual information based on determining to not use the second audio information, wherein the second audio information is used when the delivery of the first audio information could not be completed within the first threshold time or when the rendered first audio information is shorter than the second threshold time or longer than the third threshold time, modify, based on determining to use the second audio information, the first audio information to form the second audio information, wherein modifying the first audio information include modifying a playback speed of the first audio information, and wherein the second audio information, when rendered, is longer than the second threshold time and shorter than the third threshold time, and provide, based on modifying the first audio information, the second audio information, and not the first audio information, to the user in connection with the visual information.

16. The computer-readable memory of claim 15, wherein the one or more instructions, when executed by the processor, further cause the processor to:

determine whether the user is authorized to receive a channel associated with the instance of the programming, wherein the second audio information, and not the first audio data, is used when the user is not authorized to receive the channel associated with the instance of the programming.

17. The computer-readable memory of claim 15, wherein the one or more instructions, when causing the processor to determine whether the delivery of the first audio information could be completed within the first threshold time after receiving the request, further cause the processor to:

determine an undelivered portion of the first audio information, identify a size of the undelivered portion of the first audio information, determine an expected bandwidth for a channel carrying the first audio information, determine the expected delivery time based on the size of the undelivered portion of the first audio information and the expected bandwidth for the channel, and determine whether the expected delivery time occurs during the first threshold time, wherein the processor determines that the delivery of the first audio information could be completed within the first threshold time when the expected delivery time occurs during the first threshold time.

18. The computer-readable memory of claim 17, wherein the processor, when determining whether the delivery of the first audio information could be completed within the first threshold time after receiving the request, is further configured to execute the one or more instructions to:

initiate, when the expected delivery time occurs after the first threshold time, a modification to the channel, determine a modified expected bandwidth associated with the modified channel, determine a modified expected delivery time based on the size of the undelivered portion of the first audio information and the modified expected bandwidth for the channel, and determine whether the modified expected delivery time occurs during the first threshold time, wherein the processor determines that the delivery of the first audio information could be completed within the first threshold time when the modified expected delivery time occurs during the first threshold time.

19. The computer-readable memory of claim 15, wherein the one or more instructions, when executed by the processor, further cause the processor to:

receive guide data associated with the program guide, wherein the guide data includes the visual information and a link to the first audio information, and wherein the first audio information is acquired using the link.

20. The computer-readable memory of claim 15, wherein the one or more instructions, when causing the processor to modify the first audio information, is causes the processor to:

remove a portion of the first audio data information when the rendered first audio information is longer than the third threshold time, and add additional content to the first audio data information when the rendered first audio information is shorter than the second threshold time.

* * * * *